United States Patent [19]

Buddwalk

[11] Patent Number: 5,076,106
[45] Date of Patent: Dec. 31, 1991

[54] NORMAL FORCE TRANSDUCER

[75] Inventor: John A. Buddwalk, Harrisburg, Pa.

[73] Assignee: AMP Incorporated, Harrisburg, Pa.

[21] Appl. No.: 496,575

[22] Filed: Mar. 21, 1990

[51] Int. Cl.$^5$ .......................... G01L 5/00; G01L 1/22
[52] U.S. Cl. .................................. 73/862.54; 73/161; 73/862.65
[58] Field of Search ................ 73/161, 862.54, 862.65, 73/862.68, 862.01, 777; 338/2, 4, 5

[56] References Cited

U.S. PATENT DOCUMENTS

| | | | |
|---|---|---|---|
| 3,662,234 | 5/1972 | Ishii | 73/777 X |
| 4,199,980 | 4/1980 | Bowman | 338/4 X |
| 4,327,350 | 4/1982 | Erichsen | 338/4 |
| 4,380,171 | 4/1983 | Smith | 73/161 |
| 4,667,512 | 5/1987 | Buddwalk | 73/161 |

FOREIGN PATENT DOCUMENTS

| | | | |
|---|---|---|---|
| 0195232 | 9/1986 | European Pat. Off. | 73/862.68 |
| 0061628 | 3/1989 | Japan | 73/862.04 |

OTHER PUBLICATIONS

M. A. Baker, "Semiconductor Strain Gauges", Chapter 6 of Strain Gauge Technology, Jun. 1982, pp. 267–289.
Kulite, Semiconductor Strain Gage Manual, 1985, pp. 4, 8, 9, 40, 41.

Primary Examiner—Charles A. Ruehl
Attorney, Agent, or Firm—David L. Smith

[57] ABSTRACT

Apparatus for measuring the normal force ($F_n$) exerted on a pin by a receptacle contact. The normal force measuring transducer (20) has a support beam (34) and a sensing beam (50). Sensing beam (50) has a monocrystalline silicon element (30) and may include beam element (40). Piezoresistive elements ($E_1$, $E_2$, $E_3$ and $E_4$) are atomically bonded to element (30) using techniques of solid state diffusion. Fine lines (76) of conductive material interconnect the piezoresistive elements to connection pads ($GP_1$, $GP_2$, $GP_3$ and $GP_4$). The support beam (34) and sensing beam (50) have a deflecting space (70) therebetween and two supports (56,58) therealong. Normal force applied to the beams causes a change in the resistance of the piezoresistive elements indicative of the magnitude of the normal force.

25 Claims, 3 Drawing Sheets

NORMAL FORCE TRANSDUCER

BACKGROUND OF THE INVENTION

This invention relates to apparatus for measuring the contact normal force imposed by a receptacle contact on a pin received therein and in particular to a normal force transducer including a monocrystalline silicon beam.

U.S. Pat. No. 4,380,171 discloses apparatus for measuring the contact normal force between a resilient contact in a card edge connector and a pad on a printed circuit board received therein. A blade-like probe is substantially the same thickness as the printed circuit board. The probe has a base and a distal end and comprises two members defining an open space therebetween. One of the members has parallel slots defining a fixed end beam adjacent the space. The beam has a pair of strain gauges bonded thereto toward opposed ends, the gauges being connected by leads which further extend into the base for connection to current supply means and galvanometer means remote from the probe. The circuit forms a balanced bridge when the beam is not loaded. An unbalanced bridge results when the probe is inserted in a card edge connector where the beam is loaded by the normal force applied thereto by the resilient contact of the connector. The contact normal force may thus be determined by well known principles as outlined in Perry, C. C., The Strain Gauge Primer (McGraw-Hill, 1962) at pages 55-73.

U.S. Pat. No. 4,667,512 enables measuring the normal force provided by contacts which receive 0.025 inch square posts. The normal force transducer disclosed in U.S. Pat. No. 4,667,512 is not adaptable for receptacle contacts which receive a substantially smaller post, such as a 0.0156 inch thick post. Contacts of this thickness are prevalent such as in connectors manufactured and sold by the assignee in its AMPLIMITE 0.050 Series connector line. It would accordingly be desirable to have a measuring device with a probe profiled as a pin means for measuring the normal force imposed by receptacle contacts on a 0.0156 inch thick post. As beams are made smaller and smaller, the beams are of reduced stiffness. Therefore, additional stiffness must be provided from the sensing element.

SUMMARY OF THE INVENTION

In accordance with the present invention, a normal force transducer for measuring the contact normal force of a receptacle contact employs a probe having a base and a distal end. The probe comprises a beam having a monocrystalline silicon diffused integrated sensor thereon profiled as a pin. The pressure sensing surface defines an elongate monocrystalline silicon diffused integrated sensor. The circuit includes first and second pairs of piezoresistive elements atomically bonded to the monocrystalline silicon using techniques of solid state diffusion. The pairs of elements are located near the ends of a beam with respective surfaces and lead means extending therefrom for connection to current supply means remote from the probe.

The use of a monocrystalline silicon diffused integrated sensor, by virtue of using techniques of solid state diffusion, enables fabrication of circuitry dimensioned to fit within a pin-sized probe. This eliminates solder or weld joints that would tend to stiffen the beam in an irregular fashion causing non-linear gauge output signals.

Monocrystalline silicon diffused integrated sensors are well known, many are readily available by catalog from Kulite Semiconductor Products Inc., of Leonia, N.J. However, it has not been known to manufacture an elongate silicon diffused integrated sensor incorporating four longitudinal piezoresistive elements with leads extending to remote gold wire connection pads for completion of a wheatstone bridge circuit. Rather, prior art silicon diffused sensors are manufactured with solder pads immediately adjacent thereto, which would not be suitable for the present application.

BRIEF DESCRIPTION OF THE DRAWING

FIG. 4 is a plan view of the monocrystalline silicon having diffused integrated sensors atomically bonded thereto;

DESCRIPTION OF THE PREFERRED EMBODIMENT

Figure 1:
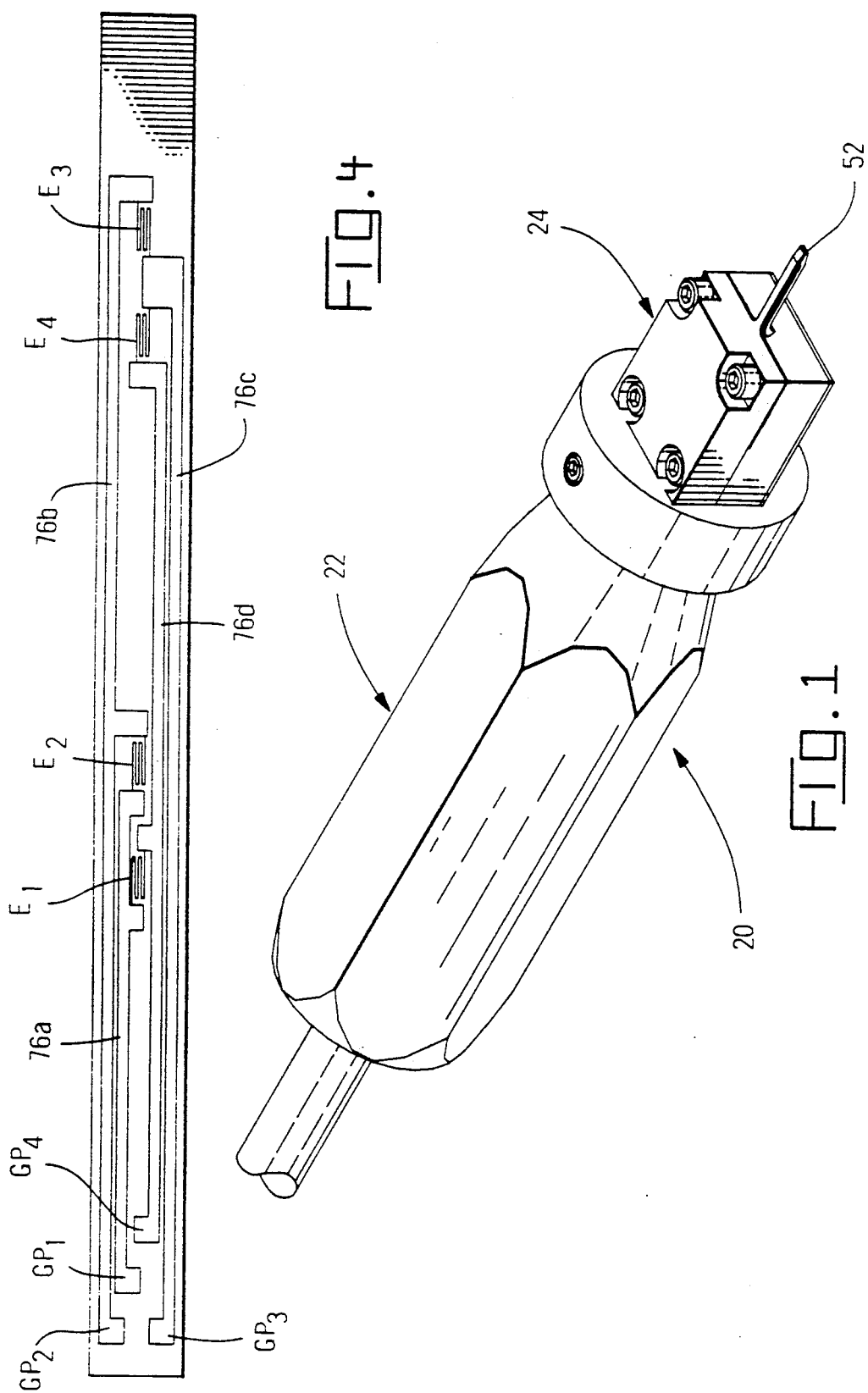
FIG. 1 is a perspective view of the normal force transducer in accordance with the present invention.

A normal force transducer 20 in accordance with the present invention is shown in FIG. 1. Transducer 20 includes a rearward hollow handle 22 and a forward sensing head section 24 secured to the handle. Handle 22 facilitates manual use of the transducer.

Figure 2:
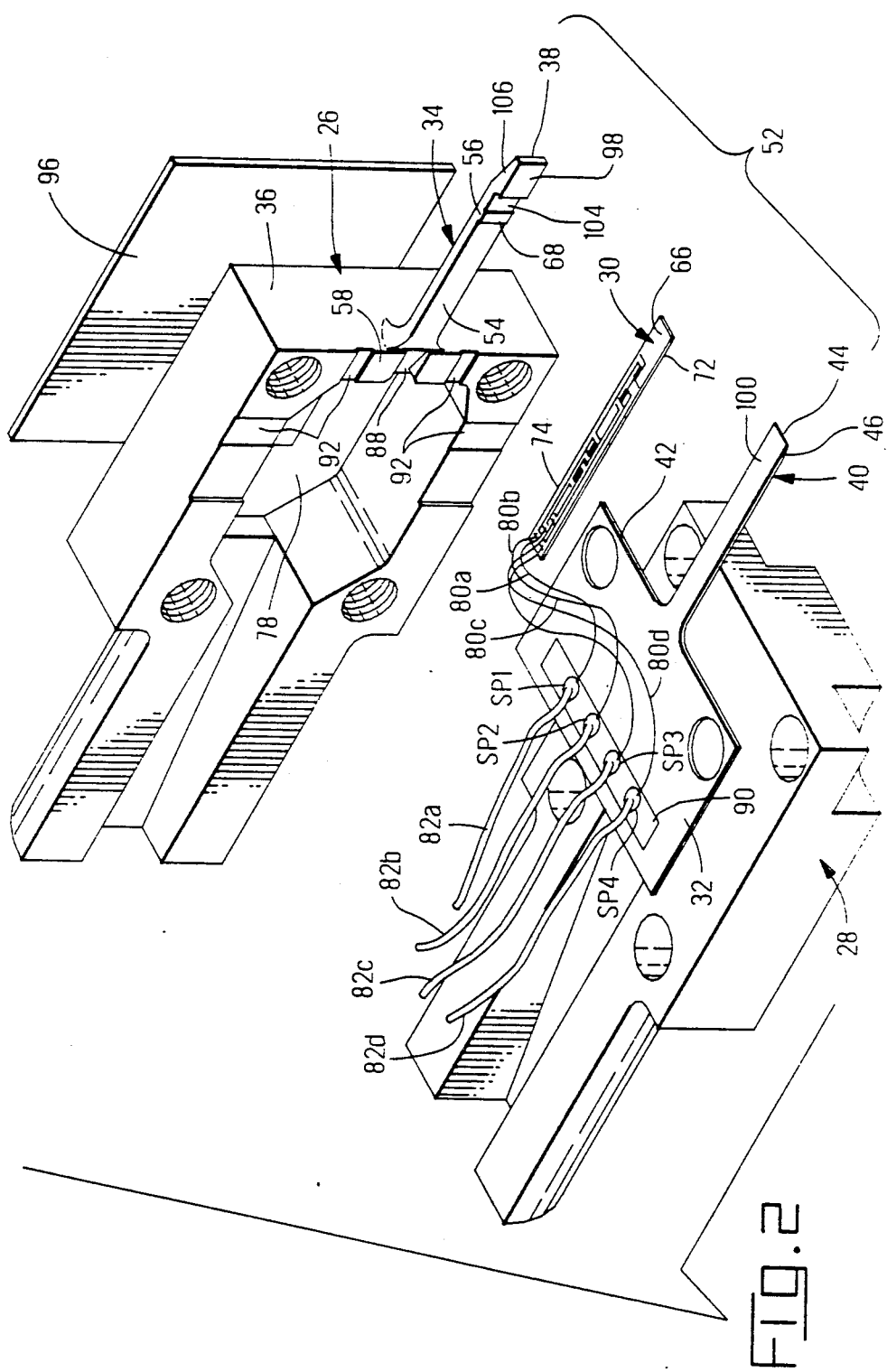
FIG. 2 is an exploded perspective view of a forward portion of the transducer.

Sensing head section 24 is best seen in the exploded perspective view of FIG. 2. Sensing head section 24 comprises, in the preferred embodiment, an upper housing member 26, a lower housing member 28, an elongate monocrystalline silicon element 30 and a shim 32.

Upper housing member 26 has a support beam 34 integral with and extending from a surface 36 thereof to a distal end 38. Shim 32 has a beam element 40 integral with and extending from surface 42 thereof to a distal end 44. Beam element 40 may have a tapered end 46 to facilitate insertion into a receptacle contact (not shown).

Figure 3:
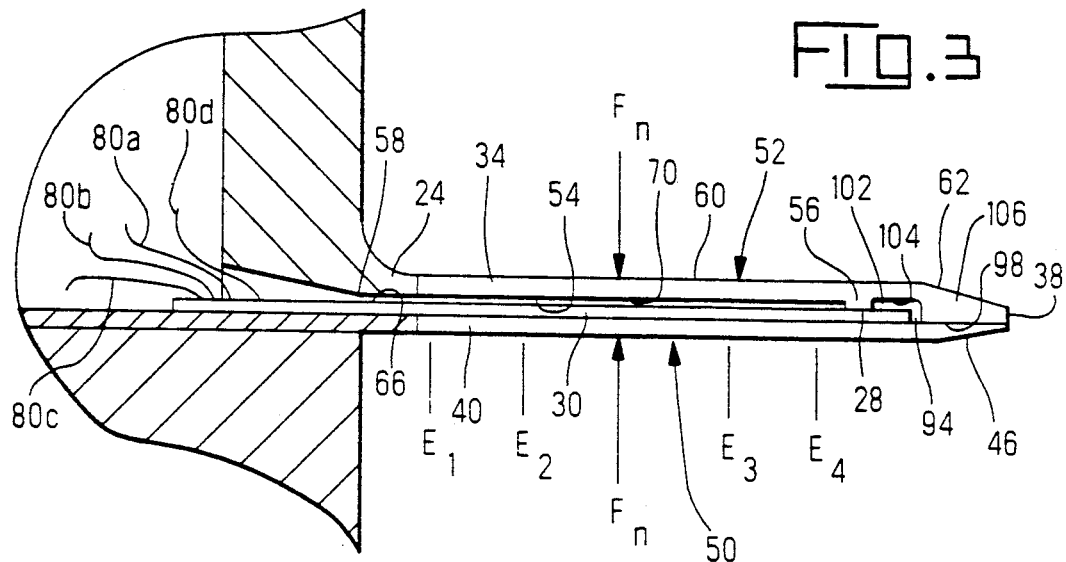
FIG. 3 is a side view partially sectioned of a forward portion of the assembled probe.

As best seen in FIG. 3, monocrystalline silicon element 30, together with beam element 40, if present, comprise a sensing beam 50. In the absence of beam element 40, shim 32 also need not be present. Element 30 would be supported by the housing proximate surface 36. Support beam 34 and sensing beam 50 constitute probe means 52.

Support beam 34 has a surface 54 positioned in the assembled transducer to face monocrystalline silicon element 30. Support beam 34 has a first support 56 upstanding from surface 54 near distal end 38 and provides a second support 58 where support beam 34 is integral with upper housing member 26. Supports 56 and 58 provide two known points of support such that when a normal force, $F_n$ is applied to outer surface 60 of support beam 34, deflection of support beam 34 will occur between the first and second supports. While a normal force will typically be applied between supports 56 and 58, the invention is not limited thereto. The normal force causes both support beam 34 and sensing beam 50 to deflect. The outer surface 60 of support beam 34 may have taper 62 at distal end 38 to facilitate insertion of probe means 52 into a receptacle contact (not shown).

Monocrystalline silicon element 30 provides a sensing beam that spans from first support 56 to second support 58. Element 30 has a surface 66 positioned in the assembled transducer to face surface 54 of support beam 34. Element 30 engages surface 68 of support 56 and is supported opposite to support 58 as will be described below. Element 30 and hence sensing beam 50 thus also has two known points of support such that when a normal force is applied thereto, deflection will occur between the two known points of support. A deflection gap or space 70 is provided between surface 54 of support beam 34 and surface 66 of element 30.

Monocrystalline silicon element 30 includes a first pair of spaced piezoresistive elements or semiconductor stress sensors $E_3$ and $E_4$ atomically bonded thereto near a first end 72, which is mounted near support 56. The piezoresistive elements are diffused integrated sensors produced using techniques of solid state diffusion. Monocrystalline silicon element 30 also includes a second pair of spaced piezoresistive elements $E_1$ and $E_2$ atomically bonded thereto near a second end 74, which is mounted near support 58.

The piezoresistive elements $E_1$, $E_2$, $E_3$ and $E_4$ have a nominal resistance of 500 ohms and thus are substantially of identical resistance. The resistance of these elements changes with the load applied thereto. Elements $E_1$ and $E_2$ are spaced the same distance apart as elements $E_3$ and $E_4$, with each pair of elements being spaced the same distance from supports 56 and 58. While four longitudinal elements are disclosed in the preferred embodiment, the invention is not limited thereto. In the preferred embodiment as best seen in FIG. 3, elements $E_1$, $E_2$, $E_3$ and $E_4$ are located between supports 56 and 58.

Figure 5:
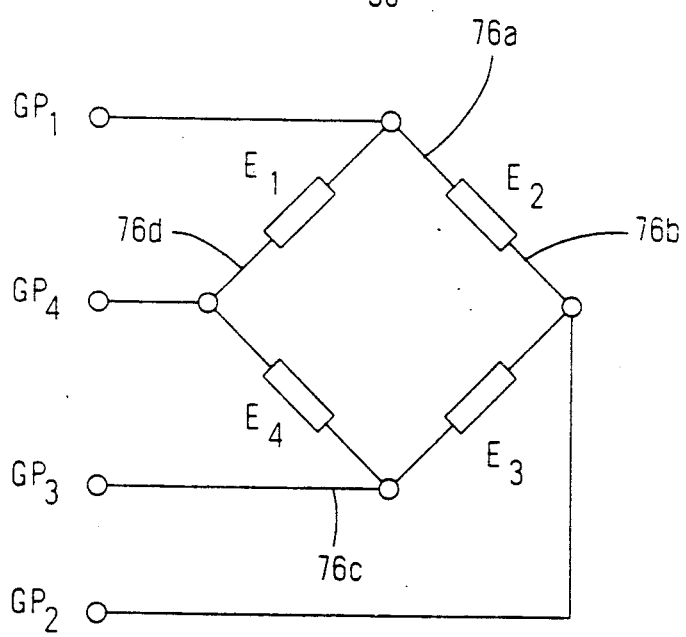
FIG. 5 is a schematic diagram of the transducer circuit.
Figure 6:
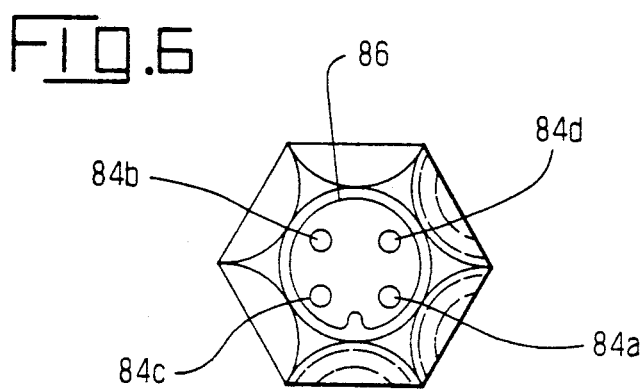
FIG. 6 is an end view of the probe showing a connector for electrically interconnecting the transducer with other equipment.

As best seen in FIG. 4, fine lines 76 of conductive material are diffused and heavily doped into the monocrystalline silicon element 30 to interconnect elements $E_1$, $E_2$, $E_3$ and $E_4$ to each other and to gold wire connection pads $GP_1$, $GP_2$, $GP_3$ and $G_4$. A schematic of the interconnection is shown in FIG. 5. Pads $GP_1$, $GP_2$, $GP_3$ and $GP_4$ are remote from the elements $E_1$, $E_2$, $E_3$ and $E_4$, near second end 74 which, when the transducer is assembled, would be received in cavity 78. Gold wires 80, shown disproportionately long in the exploded perspective view of FIG. 2, are ultrasonically bonded at both ends to interconnect respective gold wire pads $GP_1$, $GP_2$, $GP_3$ and $G_4$ to solder pads $SP_1$, $SP_2$, $SP_3$ and $SP_4$. Wires 80a–d are received in cavity 78 or in angled recess 88 adjacent thereto. Conductors 82a–d have a first end soldered to a respective solder pad, pass through hollow handle 22 and have a second end terminated on a respective terminal 84 of connector 86. Connector 86 is mounted recessed in the end of handle 22 as shown in FIG. 6. Connector 86 may be any suitable connector such as part number 204272 sold by the Assignee. In this manner, the elements $E_1$, $E_2$, $E_3$ and $E_4$ may be interconnected to each other and to a power supply or other outside equipment. Shim 32 has an insulative bondable terminal 90, sold by Measurements Group, thereon which in turn has solder pads $SP_1$, $SP_2$, $SP_3$ and $S_4$ thereon so as to electrically isolate the solder pads from shim 32. In the absence of shim 32, bondable terminal 90 would attach to housing 28.

Sensing beam 50 may also include beam element 40 and thereby be a composite beam. As transducer sensing and support beams are decreased in thickness (such as from surface 54 to outer surface 60) to simulate smaller pin contacts, there is an increased reliance on the sensing element to provide strength to the sensing beam. In the absence of beam element 40, monocrystalline element 30 provides all of the functions of a sensing beam. With beam element 40 present, element 30 and beam element 40 each contribute to the strength of the resulting composite sensing beam 50.

It is desirable to have support beam 34 and sensing beam 50 each deflect approximately the same amount into gap 70, upon being subjected to a normal force. In a preferred embodiment, the thickness of support beam 34 and sensing beam 50, between supports 56 and 58, is substantially uniform.

In a preferred embodiment, given the constraint of emulating a 0.0156 inch thick pin contact, the thickness of support beam 34 is 0.0068 inches, the thickness of sensing beam 50 is approximately 0.0085 inches. Within sensing beam 50, beam element 40 is 0.005 inches thick, element 30 is 0.003 inches thick and a bonding agent (discussed below) is 0.0005 inches thick. There is a 0.008 inch space forming gap 70 for deflection, resulting in an overall thickness from the outer edge of support beam 34 to the outer edge of sensing beam 50 of 0.0161 inch in the undeflected state. The expected deflection under a normal force of 125 grams is 0.0005 inches, resulting in an outside dimension of 0.0156 inch in the deflected state. Thus, when probe means 52 is inserted into a socket contact, a 0.0156 inch thick post will be simulated.

Support beam 34 and beam element 40 are typically manufactured of a high modulus stainless steel. Other high modulus materials including but not limited to ceramics or composites may be used. When beam element 40 is reduced in thickness to accommodate element 30, such that a composite sensing beam 50 is produced, the thickness and modulus of element 30 are relied upon in determining the deflection properties and modulus of sensing beam 50.

After manufacturing element 30, in the preferred embodiment element 30 is bonded to surface 100 of beam element 40 of shim 32 which spans angled recess 88 thereby providing support for element 30 opposite support 58. In the preferred embodiment, bonding is accomplished using a two-component epoxy phenolic adhesive such as M-bond AE-10 sold by Measurements Group room temperature cure epoxy, or equivalent. The bonding material must be capable of producing glue lines that are very fine, typically less than or equal to 0.0005 inch. Room temperature cure is desired so as not to result in the silicon element being in compression due to a mismatch of thermal expansion between element 30 and beam element 40. In this manner, element 30 is an integral part of sensing beam 50 and enhances the stiffness of sensing beam 50. In other words, the modulus of element 30 is a major portion of the modulus of the sensing beam 50.

Although the support beam 34 and sensing beam 50 are shown as having rectangular cross sections, the invention is not limited thereto. Other cross sections, including but not limited to T-section, U-sections and chordal sections of a circle are contemplated within the scope of the invention.

After element 30 has been bonded to beam element 40, housings 26 are 28 are sandwiched together retaining shim 32 and element 30 therebetween. Housings 26 and 28 may be secured in any known manner, such as passing bolts through apertures in the housings and shim 32. Bonding agent placed in the region of gap 102 between surfaces 104 and 66 holds surface 66 of element 30 firmly against surface 68. The bonding agent may also be placed in recesses 92 (see FIGS. 2 and 3) during assembly. Gap 94 provides for manufacturing clearance between the end of element 30 and end 106 of support beam 34. Support beam 34 and beam element 40 are soldered or welded at elevated surface 98 to form a solid-ended probe.

Subsequent to manufacture, the gold wire pads and solder pads are accessible by removing cover plate 96.

FIG. 5 is a schematic diagram showing the interconnections between elements $E_1$, $E_2$, $E_3$, $E_4$ and gold wire pads $GP_1$, $GP_2$, $GP_3$ and $GP_4$. The gold wire pads $GP_1$ and $GP_3$, corresponding to solder pads $SP_1$ and $SP_3$ provide connection points for a battery or other current source. Gold wire pads $GP_2$ and $GP_4$, corresponding to solder pads $SP_2$ and $SP_4$, provide connection points for a galvanometer. In accordance with known strain gauge transducer principles, the current flow in the galvanometer provides a measure of the normal force on element 30 of sensing beam 50, and is independent of the load position of the normal force. The normal force transducer is readily calibrated using certified weights.

I claim:

1. A device for measuring the normal force of a receptacle contact which receives a pin, said device comprising:
   a probe having a first support proximate a base and a second support proximate a distal end, said probe having a first beam and a second beam, outer surfaces of which are collectively profiled as said pin, said first beam having a deflecting portion between said supports defining an inner surface facing said second beam;
   a silicon sensor bonded to said inner surface of said first beam, said silicon sensor extending between said first support and said second support, said sensor comprising a first pair of piezoresistive elements bonded to said inner surface proximate said first support, and a second pair of piezoresistive elements bonded to said inner surface proximate said second support, said sensor further comprising lead means for electrically interconnecting said piezoresistive elements to current supply means and galvanometer means remote from said probe, said sensor forming a balanced bridge when said first beam is not deflected, whereby an unbalanced bridge condition indicative of the magnitude of the deflecting force results when said first beam is deflected by a normal force.

2. A device as recited in claim 1, wherein said silicon sensor further comprises gold wire pads proximate said first support, said lead means comprising individual leads extending to respective gold wire pads.

3. A device as recited in claim 2, wherein the probe defines an axis through said beams and said gold wire pads are serially aligned with the axis of the probe.

4. A device as recited in claim 1, characterized by said first and second beams being collectively profiled to simulate a 0.0156 inch thick pin.

5. A device as recited in claim 4, wherein a dimension across the outer surfaces of said beams is slightly greater than 0.0156 inch when said beams are not deflected by a normal force, whereby the beams approximate a 0.0156 inch thick pin when subjected to a normal force.

6. A device as recited in claim 1, wherein said lead means comprise lines of conductive material diffused into said silicon sensor.

7. A transducer for measuring normal force applied thereto, said transducer comprising:
   a first beam having a first support proximate a first end and a second support proximate a second, distal end, and;
   a second beam, said second beam comprising monocrystalline silicon, said monocrystalline silicon extending between said first support and said second support, said second beam defining a deflection space between a first surface of said second beam and said first beam, said monocrystalline silicon having a first pair of piezoresistive force sensing elements bonded to a surface thereof proximate said first support, and a second pair of piezoresistive force sensing elements bonded to a surface thereof proximate said second support.

8. A transducer as recited in claim 7, wherein the deflection space is further delimited by said first and second supports.

9. A transducer as recited in claim 7, wherein the piezoresistive elements are atomically bonded to said monocrystalline silicon.

10. A transducer as recited in claim 9, wherein the first beam is metallic.

11. A transducer as recited in claim 10, wherein the first beam is stainless steel.

12. A transducer as recited in claim 7, wherein said second beam further comprises support means, said support means extending substantially the length of said second beam.

13. A transducer as recited in claim 12, wherein the first beam and second beam and support means are deflectable upon application of a normal force, the amount of deflection of said second beam and support means being substantially equal to the amount of deflection of said first beam for a predetermined normal force.

14. A transducer as recited in claim 7, wherein the force sensing elements are an integral part of said second beam.

15. A transducer as recited in claim 7, wherein said second beam has a regular cross section.

16. A transducer as recited in claim 15, wherein said cross section is a rectangle.

17. A transducer as recited in claim 7, wherein the first beam and second beam are deflectable and wherein said first and second beams are of substantially the same stiffness, whereby upon application of a normal force to said first and second beams, there is balanced deflection of the two beams.

18. A transducer as recited in claim 7, further comprising lead means for electrically interconnecting said piezoresistive elements to current supply means and galvanometer means remote from said transducer.

19. A transducer as recited in claim 18, wherein said lead means comprise lines of conductive material diffused into said monocrystalline silicon.

20. A transducer as recited in claim 7, further comprising lines of conducive material diffused into said monocrystalline silicon to interconnect said piezoresistive elements to each other.

21. A transducer for measuring normal force applied thereto, said transducer comprising:

a first beam having a first support proximate a first end and a second support proximate a second, distal end; and a second beam, said second beam having a monocrystalline silicon first member and a second member, said monocrystalline silicon first member extending between said first support and said second support, said second beam defining a deflection space between a first surface of said first member and said first beam, said first surface of said first member having a first pair of piezoresistive force measuring elements proximate said first support, and a second pair of piezoresistive force sensing elements proximate said second support.

22. A transducer as recited in claim 21, wherein the deflection space is delimited by said first and second supports.

23. A transducer as recited in claim 21, wherein the piezoresistive elements are atomically bonded to said first member.

24. A transducer as recited in claim 21, wherein the first beam and second beam are deflectable upon application of a normal force, the amount of deflection of said second beam being substantially equal to the amount of deflection of said first beam for a predetermined normal force.

25. A transducer as recited in claim 21, wherein said second member is stainless steel.

* * * * *

UNITED STATES PATENT AND TRADEMARK OFFICE
CERTIFICATE OF CORRECTION

PATENT NO. : 5,076,106

DATED : December 31, 1991

INVENTOR(S) : John A. Buddwalk

It is certified that error appears in the above-identified patent and that said Letters Patent is hereby corrected as shown below:

Column 4, line 24, "0.008" should read --0.0008--.

Signed and Sealed this

Fourth Day of May, 1993

Attest:

MICHAEL K. KIRK

Attesting Officer

Acting Commissioner of Patents and Trademarks